US006693637B2

United States Patent
Koneru et al.

(10) Patent No.: US 6,693,637 B2
(45) Date of Patent: Feb. 17, 2004

(54) METHOD AND APPARATUS FOR DETERMINING BINS TO BE UPDATED FOR POLYGONS, INCLUDING LINES

(75) Inventors: Satyaki Koneru, Folsom, CA (US); Sajjad A. Zaidi, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 10/038,924

(22) Filed: Dec. 31, 2001

(65) Prior Publication Data

US 2003/0122819 A1 Jul. 3, 2003

(51) Int. Cl.[7] ............................. G06F 15/00; G06T 1/00
(52) U.S. Cl. ..................... 345/501; 345/418; 345/443; 345/622
(58) Field of Search ................................ 345/501, 418, 345/502, 423, 419, 427, 441, 443, 620, 622, 530

(56) References Cited

U.S. PATENT DOCUMENTS

| | | | | |
|---|---|---|---|---|
| 6,344,852 B1 | * | 2/2002 | Zhu et al. | 345/418 |
| 6,380,935 B1 | * | 4/2002 | Heeschen et al. | 345/423 |
| 6,437,780 B1 | * | 8/2002 | Baltaretu et al. | 345/423 |
| 2003/0122815 A1 | * | 7/2003 | Deering | 345/419 |

* cited by examiner

Primary Examiner—Kee M. Tung
(74) Attorney, Agent, or Firm—Blakely, Sokoloff, Taylor & Zafman LLP

(57) ABSTRACT

Embodiments of the present invention provide a method and apparatus for determining the zones that a polygon overlaps to minimize the bins that are updated during binning and reduce the number of polygons to be set up in the render phase. The polygons supported include, but are not limited to, points, lines, triangles and rectangles. Each zone has associated with it a batch buffer to which data is written back for the polygons that overlap that zone. This data includes the setting up of state and the indices for those polygons. Since the zones that a polygon overlaps is precisely determined, the data written back is minimized and the polygons to be set up during the render phase is optimally reduced.

26 Claims, 12 Drawing Sheets

METHOD AND APPARATUS FOR DETERMINING BINS TO BE UPDATED FOR POLYGONS, INCLUDING LINES

BACKGROUND

1. Field

The present invention relates generally to graphics systems and more particularly to graphics-rendering systems.

2. Background Information

Computer graphics systems are commonly used for displaying graphical representations of objects on a two-dimensional video display screen. Current computer graphics systems provide highly detailed representations and are used in a variety of applications. In typical computer graphics systems, an object to be represented on the display screen is broken down into graphics primitives. Primitives are basic components of a graphics display and may include points, lines, vectors and polygons, such as triangles and quadrilaterals. Typically, a hardware/software scheme is implemented to render or draw the graphics primitives that represent a view of one or more objects being represented on the display screen.

The primitives of the three-dimensional objects to be rendered are defined by a host computer in terms of primitive data. For example, when the primitive is a triangle, the host computer may define the primitive in terms of X, Y and Z coordinates of its vertices, as well as the red, green and blue (R, G and B) color values of each vertex. Additional primitive data may be used in specific applications.

Image rendering is the conversion of a high-level object-based description into a graphical image for display on some display device. For example, an act of image rendering occurs during the conversion of a mathematical model of a three-dimensional object or scene into a bitmap image. Another example of image rendering is converting an HTML document into an image for display on a computer monitor. Typically, a hardware device referred to as a graphics-rendering engine performs these graphics processing tasks. Graphics-rendering engines typically render scenes into a buffer that is subsequently output to the graphical output device, but it is possible for some rendering-engines to write their two-dimensional output directly to the output device. The graphics-rendering engine interpolates the primitive data to compute the display screen pixels that represent the each primitive, and the R, G and B color values of each pixel.

A graphics-rendering system (or subsystem), as used herein, refers to all of the levels of processing between an application program and a graphical output device. A graphics engine can provide for one or more modes of rendering, including zone rendering. Zone rendering attempts to increase overall 3D rendering performance by gaining optimal render cache utilization, thereby reducing pixel color and depth memory read/write bottlenecks. In zone rendering, a screen is subdivided into an array of zones and per-zone instruction bins, used to hold the entire primitive and state setting instructions required to render each sub-image, are generated. Whenever a primitive intersects or possibly intersects a zone, that primitive instruction is placed in the bin for that zone. In particular, a bounding box is generated to enclose the primitive and all the bins associated with zones lying inside the bounding box are updated. In most cases, the primitive does not intersect all of the zones lying within the bounding box. Updating all of the bins, including those not associated with intersected zones, negates performance benefits of binning, especially for scenes with large, skinny polygons.

Some primitives will intersect more than one zone, in which case the primitive instruction is replicated in the corresponding bins. This process is continued until the entire scene is sorted into the bins. Following the first pass of building a bin for each zone intersected by a primitive, a second zone-by-zone rendering pass is performed. In particular, the bins for all the zones are rendered to generate the final image.

Zone rendering performance, particularly the binning process, is especially important in unified memory architectures where memory bandwidth is at a premium. Processing bins associated with non-intersected zones unnecessarily increases memory bandwidth requirements. Moreover, the graphics-rendering engine utilizes additional memory bandwidth to process the binned command structures associated with the bins associated with non-intersected zones.

What are needed therefore are a method, apparatus and system for determining the zones that a polygon overlaps to minimize the bins that are updated during binning.

DETAILED DESCRIPTION

Figure 1:
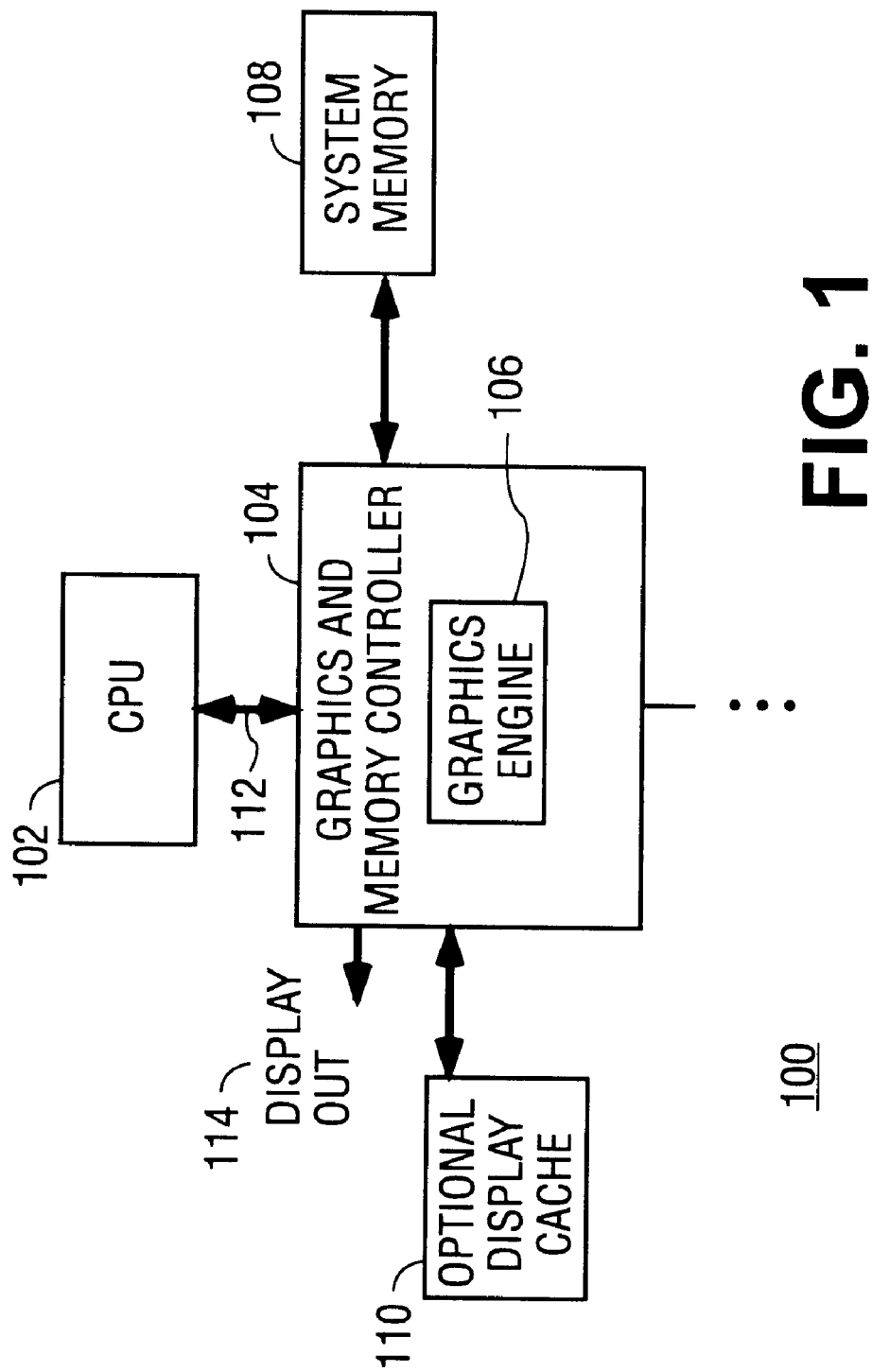
FIG. 1 illustrates a block diagram of an embodiment of a computer system including an embodiment of a graphics device for determining the bins to be updated for zone rendering.

Embodiments of the present invention provide a method and apparatus for determining the zones that a polygon overlaps to minimize the bins that are updated during binning and reduce the number of polygons to be set up in the render phase. The polygons supported include, but are not limited to, points, lines, triangles and rectangles. Each zone has associated with it a batch buffer to which data is written back for the polygons that overlap that zone. This data includes the setting up of state and the indices for those polygons. Since the zones that a polygon overlaps is precisely determined, the data written back is minimized and the polygons to be set up during the render phase is optimally reduced.

In the detailed description, numerous specific details are set forth in order to provide a thorough understanding of the present invention. However, it will be understood by those skilled in the art that the present invention maybe practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 1. Sample system 100 may be used, for example, to execute the processing for methods in accordance with the present invention, such as the embodiment described herein. Sample system 100 is representative of processing systems based on the microprocessors available from Intel Corporation, although other systems (including personal computers (PCs) having other microprocessors, engineering workstations, set-top boxes and the like) may also be used. In one embodiment, sample system 100 may be executing a version of the WINDOWS.™. operating system available from Microsoft Corporation, although other operating systems and graphical user interfaces, for example, may also be used.

FIG. 1 is a block diagram of a system 100 of one embodiment of the present invention. The computer system 100 includes central processor 102, graphics and memory controller 104 including graphics device 106, memory 108 and display device 114. Processor 102 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Processor 102 may be coupled to common bus 112 that transmits data signals between processor 102 and other components in the system 100. FIG. 1 is for illustrative purposes only. The present invention can also be utilized in a configuration including a descrete graphics device.

Processor 102 issues signals over common bus 112 for communicating with memory 108 or graphics and memory controller 104 in order to manipulate data as described herein. Processor 102 issues such signals in response to software instructions that it obtains from memory 108. Memory 108 may be a dynamic random access memory (DRAM) device, a static random access memory (SRAM) device, or other memory device. Memory 108 may store instructions and/or data represented by data signals that may be executed by processor 102, graphics device 106 or some other device. The instructions and/or data may comprise code for performing any and/or all of the techniques of the present invention. Memory 108 may also contain software and/or data. An optional cache memory 110 may be used to speed up memory accesses by the graphics device 106 by taking advantage of its locality of access. In some embodiments, graphics device 106 can offload from processor 102 many of the memory-intensive tasks required for rendering an image. Graphics device 106 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Graphics device 106 may be coupled to common bus 112 that transmits data signals between graphics device 106 and other components in the system 100, including render cache 110 and display device 114. Graphics device 106 includes rendering hardware that among other things writes specific attributes (e.g. colors) to specific pixels of display 114 and draw complicated polygons on display device 114. Graphics and memory controller 104 communicates with display device 114 for displaying images rendered or otherwise processed by a graphics controller 104 for displaying images rendered or otherwise processed to a user. Display device 114 may comprise a computer monitor, television set, flat panel display or other suitable display device.

Memory 108 stores a host operating system that may include one or more rendering programs to build the images of graphics polygons for display. System 100 includes graphics device 106, such as a graphics accelerator that uses customized hardware logic device or a co-processor to improve the performance of rendering at least some portion of the graphics polygons otherwise handled by host rendering programs. The host operating system program and its host graphics application program interface (API) control the graphics device 106 through a driver program.

Figure 2:
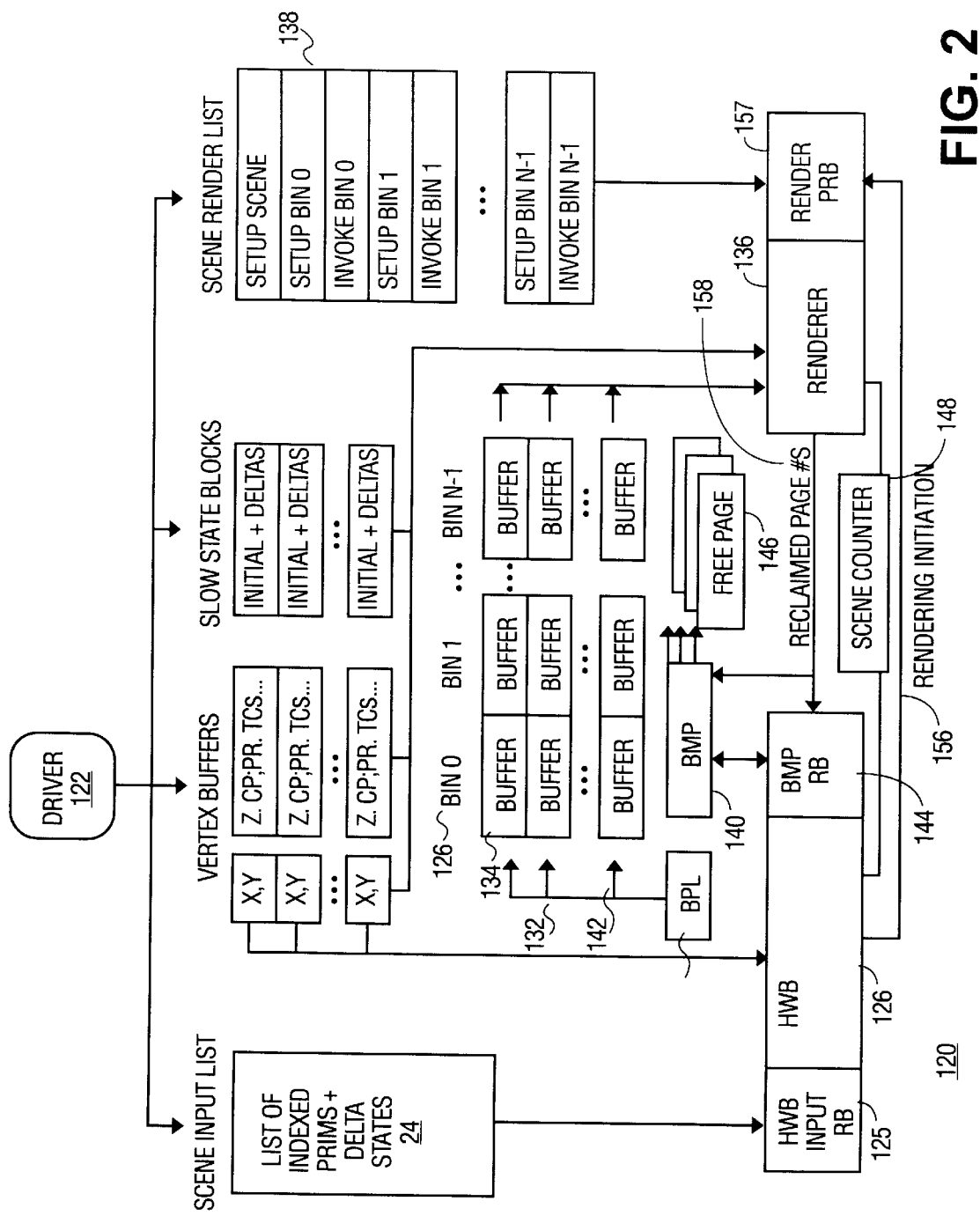
FIG. 2 illustrates a block diagram of an embodiment of a graphics device including a graphics-binning engine for processing a scene input list including delta states, graphics-rendering engine and bins.
Figures 3, 4:
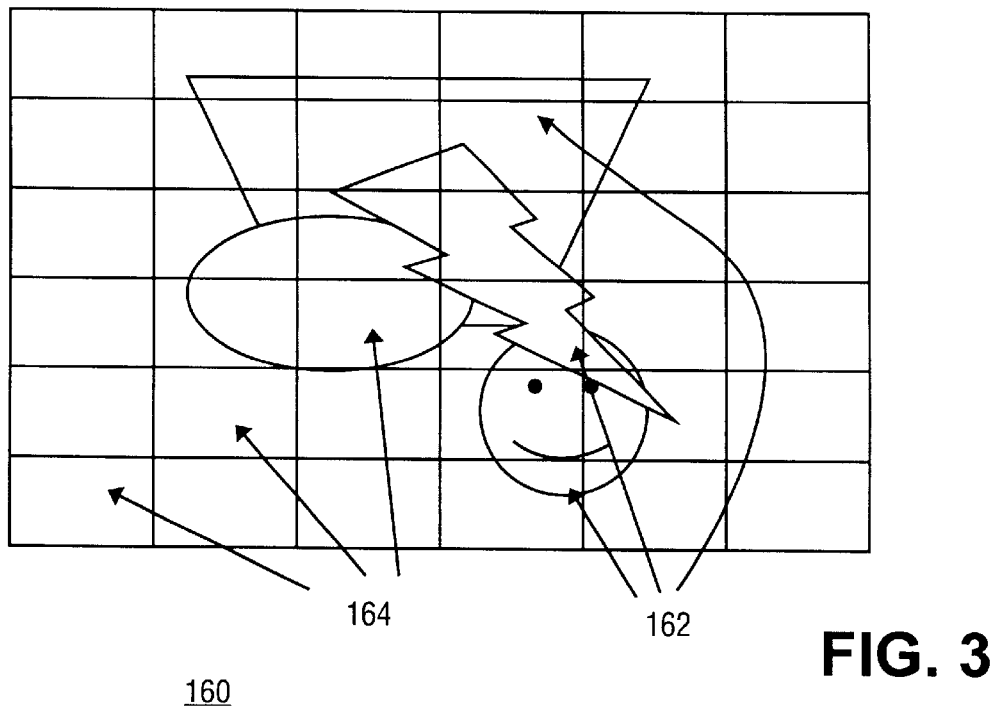
FIG. 3 illustrates a depiction of an embodiment of a zone renderer screen view including zones and geometrical primitives.
FIG. 4 is a flow diagram illustrating an embodiment for determining the bins that need to be updated for all kinds of polygons.

Referring to FIG. 3, an embodiment 160 of various screen objects implemented on a zone rendering system 120 (shown in FIG. 2) is illustrated. A screen object to be presented on the display screen is broken down into graphics polygons 162. Polygons 162 may include, but are not limited to, graphical objects such as polygons (e.g., triangles and quadrilaterals), lines, points and vectors. The graphics engine 106 is implemented to render, or draw, the graphics polygons 162 that represent a view of one or more screen objects being represented on the display screen. In zone rendering, a screen is subdivided into an array of zones 164 commonly screen-space rectangles although other geometric variants may be used as well. Each zone 164 is associated with a bin. Each bin 128 includes a chained series of command buffers 134 stored within non-contiguous physical memory pages. The bins 128 are thus preferably implemented as a chain of independent physical pages.

Render Cache

Rendering performance improves as a result of the polygons 162 being divided into zones 164 that are aligned to the render cache 110. Since the graphics device 106 is only working on a small portion of the screen at a time (i.e. a zone 164), it is able to hold the frame buffer contents for the entire zone 164 in a render cache 110. The dimensions of the zone 164 are typically a constant tuned to the size and organization of the render cache 110. It is by this mechanism that the render cache 110 provides optimal benefits—reuse of cached data is maximized by exploiting the spatial coherence of a zone 164. Through use of the zone rendering mode, only the minimum number of color memory writes need be performed to generate the final image one zone 164 at a time, and color memory reads and depth memory reads and writes can be minimized or avoided altogether. Use of the render cache 110 thus significantly reduces the memory traffic and improves performance relative to a conventional renderer that draws each polygon completely before continuing to the next polygon.

Binning

The process of assigning polygons (and their attributes) 162 to zones 164 is referred to as binning. "Bin"128 refers to the abstract buffer used for each zone—where a bin 128 will typically be realized as a series of instruction batch buffers 134. Binning performs the necessary computations to determine what polygons 162 lie in what zones 164 and can be performed by dedicated hardware and/or software implementations.

When a polygon 162 intersects a zone 164, the corresponding polygon instruction is placed in the bin 128 associated with the zone 164 intersected. Per-zone instruction bins 128 are thus used to hold polygon instructions and state-setting instructions required to render each sub-image and are generated by comparing the screen-space extent of each polygon 162 to the array of zones 164. Thus, as the polygons 162 are received, the present invention determines which zone(s) 164 each polygon 162 intersects, and replicates the polygon instructions into a bin 128 associated with each of these zones 164.

In one typical implementation, a driver 122 writes out a set of polygon instructions to be parsed by the graphics-binning engine 126. For each zone 164 intersected by a polygon 162, the graphics-binning engine writes corresponding polygon instructions into buffers 134 associated with the zones 164 intersected. Some polygons 162 will intersect more than one zone 164, in which case the polygon instruction is replicated in bins 128 corresponding to the intersected zones 164. For example, the lightning bolt depicted in FIG. 3 intersects nine zones 164. This process is continued until the entire scene is sorted into bins 128.

FIG. 4 is a flow diagram illustrating an embodiment 170 for determining the bins that need to be updated for all kinds of polygons.

The screen is initially subdivided into an array of zones 164, where the optimal dimensions of the zone sub-rectangles are dictated by the render cache size and organization (step 172).

Pre-zone instruction bins 128, used to hold all of the polygon and state-setting instructions required to render each sub-image, are generated (step 174). This is accomplished by comparing the screen-extent of each polygon to the array of zones.

When there is an unbinned primitive in the scene to be rendered, the polygon is segmented from the scene (step 176). Any of several well-known segmentation techniques can be used to segment a polygon from the remainder of the scene.

Embodiments of the present invention provide a method and apparatus for determining the zones that a polygon, such as a point, rectangle, line or triangle, overlaps to minimize the bins that are updated during binning and reduce the number of polygons to be set up in the render phase (step 178). In particular, for each object 162, the binning engine 126 forms a screen-aligned object-bounding box. In some embodiments, such as for determining which bins 128 should be updated for a line, a bounding box expansion value is utilized to assign polygons (and their associated attributes) to zones 164 for rendering (i.e. binning).

Each zone has associated with it a batch buffer to which data is written back for the polygons that overlap that zone. This data includes the setting up of state and the indices for those polygons. If the zones that a polygon overlaps is precisely determined, then not only is the data written back minimized, but also the polygons to be set up during the render phase is optimally reduced. After all the polygons in the scene have been binned, rendering engine 136 renders the binned zones.

Points

Figure 5:
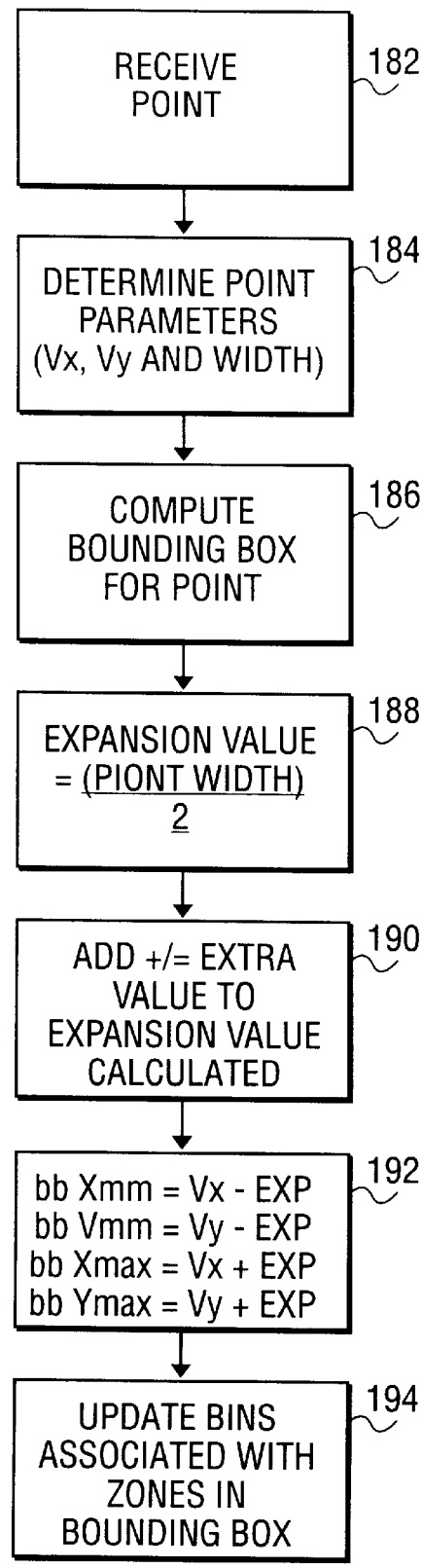
FIG. 5 illustrates a detailed flow diagram of an embodiment of a process for determining the bins that need to be updated for a point.

FIG. 5 illustrates a detailed flow diagram of an embodiment 180 of a process for determining the bins that need to be updated for a point. When a point is received (step 182), the point parameters such as vertex values Vx and Vy and point width are determined (step 184). A bounding box is created from vertex values specified (step 214). The bounding box 148 may be expanded by an extra pixel in each direction to accommodate the different point rasterization rules (step 188). The expansion value can be defined as follows:

$$\text{Expansion value} = \text{PointWidth}/2 \quad \text{(Eq. 1)}$$

The expansion value can be modified by another predefined value, such as +/−1 pixel to accommodate point rasterization rules (step 190). After modification of the expansion value, the bounding box could thus be generated (step 192) as follows:

$$\text{bounding box\_xmin} = \text{vertex}(x) - \text{modified expansion} \quad \text{(Eq. 2)}$$

$$\text{bounding box\_ymin} = \text{vertex}(y) - \text{modified expansion} \quad \text{(Eq. 3)}$$

$$\text{bounding box\_xmax} = \text{vertex}(x) + \text{modified expansion} \quad \text{(Eq. 4)}$$

$$\text{bounding box\_ymax} = \text{vertex}(y) + \text{modified expansion} \quad \text{(Eq. 5)}$$

One skilled in the art will recognize that the predefined value may be via any means and the value is not limited to +/−1 pixel. All the bins associated with the zones inside the expanded bounding box are then updated (step 194).

Rectangles

Figure 6:
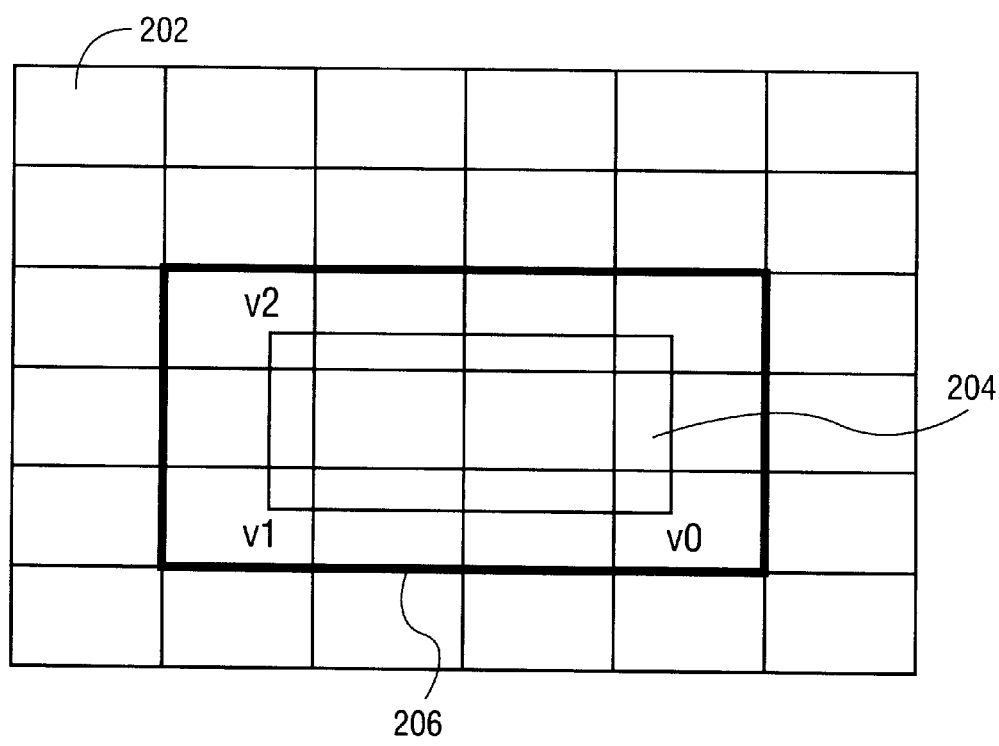
FIG. 6 illustrates a depiction of an embodiment of a screen view including zones and a rectangle.

FIG. 6 illustrates a depiction of an embodiment of a screen view 200 including zones 202 and a rectangular primitive 204. For rectangles, bounding box 206 is generated from the vertex coordinates V0$x$, V0$y$, V1$x$, V1$y$, V2$x$, V2$y$ and all zones a 202 inside bounding box 206 are updated. (The x and y coordinates of the fourth vertex of the rectangle object can be computed from the first three vertices V0, V1 and V2.) The minimum and maximum values of the three x and y terms are used to form bounding box 206. In a typical implementation, vertex x and y positions are in screen (pixel) coordinates. These positions are quantized to sub pixel precision by rounding the incoming values to the nearest sub pixel (using round-to-nearest-or even rules) and the device support for four fractional (sub pixel) position bits. The maximum and minimum terms are formed using integer x and y values, and the four bit fractional values can be ignored to save gates.

Figure 7:
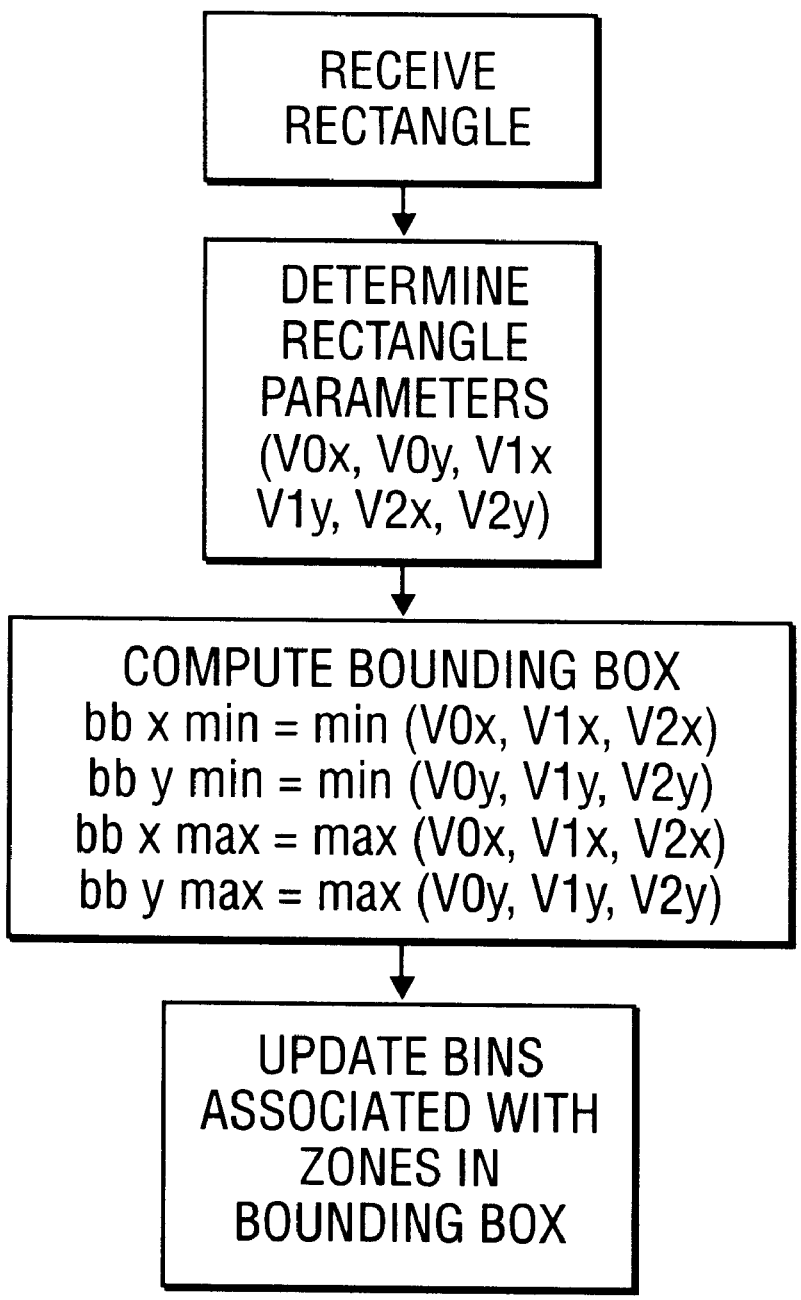
FIG. 7 illustrates a detailed flow diagram of an embodiment of a process for determining the bins that need to be updated for a rectangle.

FIG. 7 illustrates a detailed flow diagram of an embodiment 208 of a process for determining the bins that need to be updated for a rectangle. When a rectangle is received (step 210), the point parameters such as vertex values v0$x$, v0$y$, v1$x$, v1$y$, v2$x$, and v2$y$ are determined (step 212). A bounding box is created from the vertex values specified (step 214) as follows:

$$\text{bounding box xmin} = \text{minimum}(v0x, v1x, v2x) \quad \text{(Eq. 6)}$$

$$\text{bounding box ymin} = \text{minimum}(v0y, v1y, v2y) \quad \text{(Eq. 7)}$$

$$\text{bounding box xmax} = \text{maximum}(v0x, v1x, v2x) \quad \text{(Eq. 8)}$$

$$\text{bounding box ymax} = \text{maximum}(v0y, v1y, v2y) \quad \text{(Eq. 9)}$$

All the bins associated with the zones inside the expanded bounding box are then updated (step 216).

Lines

Figure 8:
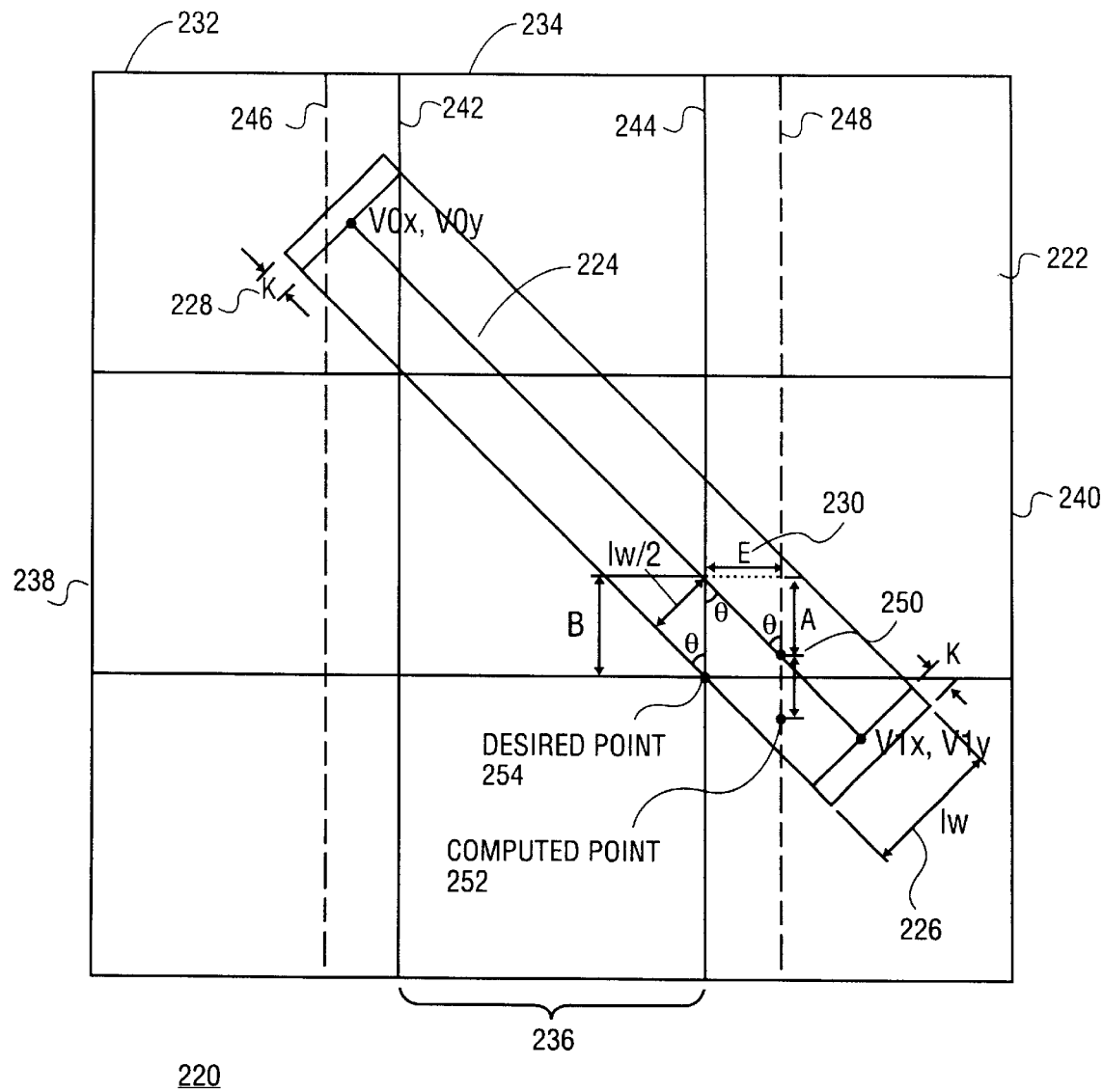
FIG. 8 illustrates a depiction of an embodiment of a screen view including zones and a line.

FIG. 8 illustrates a depiction of an embodiment 220 of a screen view including zones 222 and line polygon 224. Line 224 is defined by vertex coordinates v0$x$, v0$y$, v1$x$ and v1$y$, line-width (lw) 226 and line-cap (lc) 228. Both line-width 226 and line-cap 228 are programmable constant values and used to calculate a bounding box expansion value (E) 230 as discussed in detail below. The edges parallel to line 224 are located at the distance (line width/2) from the line. The line cap edges are perpendicular to the line.

Bounding box region [x,y][min,max] 232 encloses line 224 and is formed by taking the minimum and maximum values of the line vertices' v0 and v1 x, y positions and can be defined as follows:

$$\text{bb\_xmin} = \min(v0x, v1x) \quad \text{(Eq. 10)}$$

$$\text{bb\_ymin} = \min(v0y, v1y) \quad \text{(Eq. 11)}$$

$$\text{bb\_xmax} = \max(v0x, v1x) \quad \text{(Eq. 12)}$$

$$\text{bb\_ymax} = \max(v0y, v1y) \quad \text{(Eq. 13)}$$

Bounding box region 232 is traversed one column of zones at a time, from left boundary 238 to right boundary 240. One skilled in the art will recognize that the direction bounding box region 232 is traversed is not critical to the invention. For example, bounding box region 232 could be traversed from right to left and so forth. Each individual bounding box column traversed, such as bounding box column 234, has an initial width of one column 236 and a top and bottom boundary defined by bounding box region 232. Bounding box column 234 is expanded along right and left columns edges by an expansion value defined as follows:

$$E = \text{ceiling}(lw/2 + lc) \quad \text{(Eq. 14)}$$

where lw=line width and lc=line cap.

Bounding box expansion value (E) is used to shift left and right edges 242 and 244 outwardly to expanded left and right edges 246 and 248, respectively. Line intercepts, if any, are computed on modified edges 246 and 248. For example, line 224 intercepts right edge 248 at location 250. The intercept value at 250 is further shifted outwardly along shifted intercept edge, such as 248, by expansion value (E) to arrive at computed point 252. The intercept value at 250 is shifted such that computed point 252 resides below desired point 254 to minimize the possibility of missed bits. Intercept values are shifted such that they expand the region to minimize the risk of bits being missed. For example, any intercepts on the opposite end of line 224 would be shifted upwards.

Potentially six values (four potential expansion value modified line intercepts, and two potential vertices v0 and v1) reside within expanded bounding box column edges. All of the zones residing between the minimum and maximum of the potentially six values within expanded bounding box column edges are updated. In particular, the minimum and maximum points define the top and bottom of the column 234 and the expanded bounding box column edges, such as edges 246 and 248, define the right and left sides.

Figure 9A:
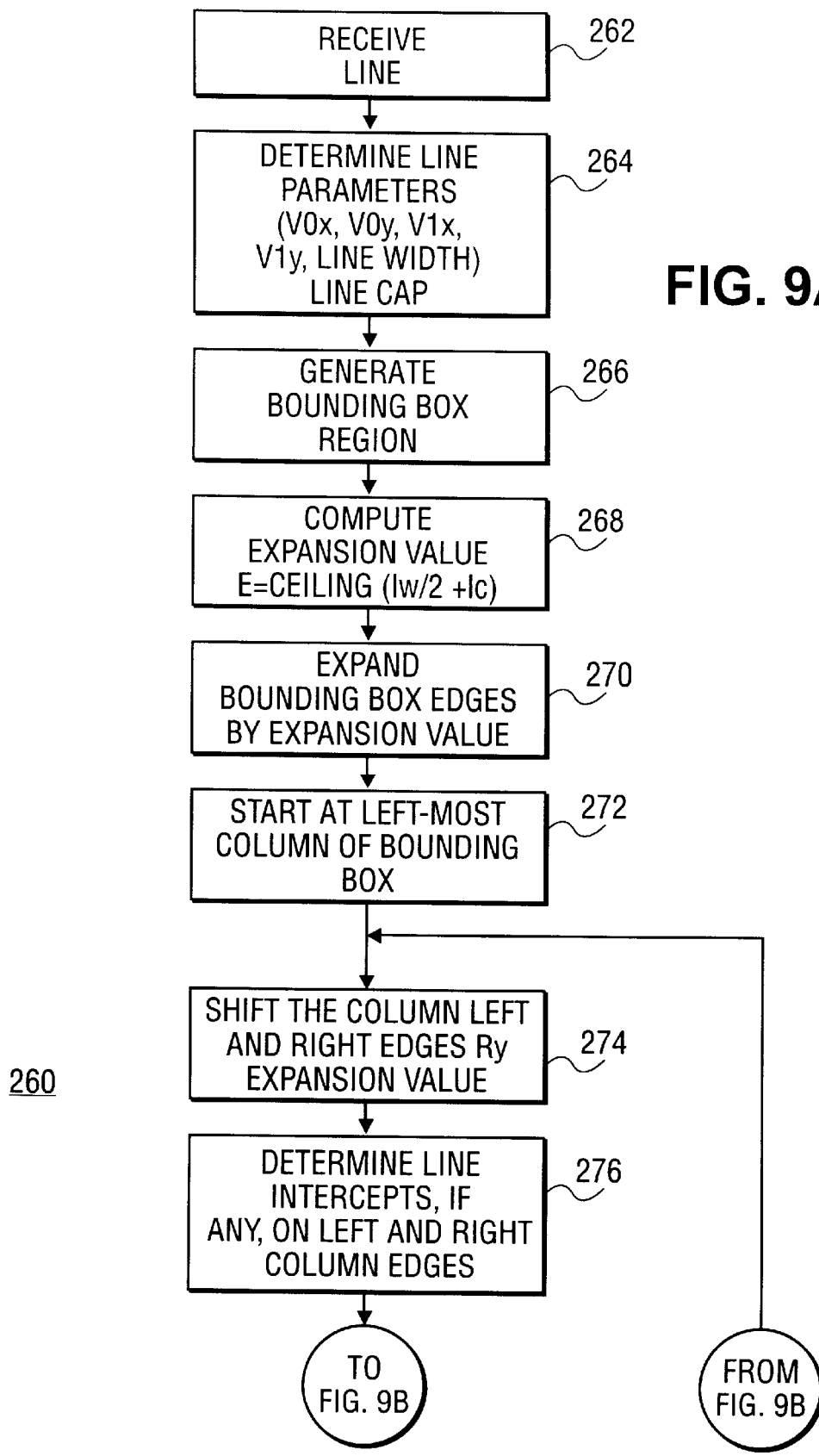
FIG. 9 illustrates a detailed flow diagram of an embodiment of a process for determining the bins that need to be updated for a line.
Figure 9B:
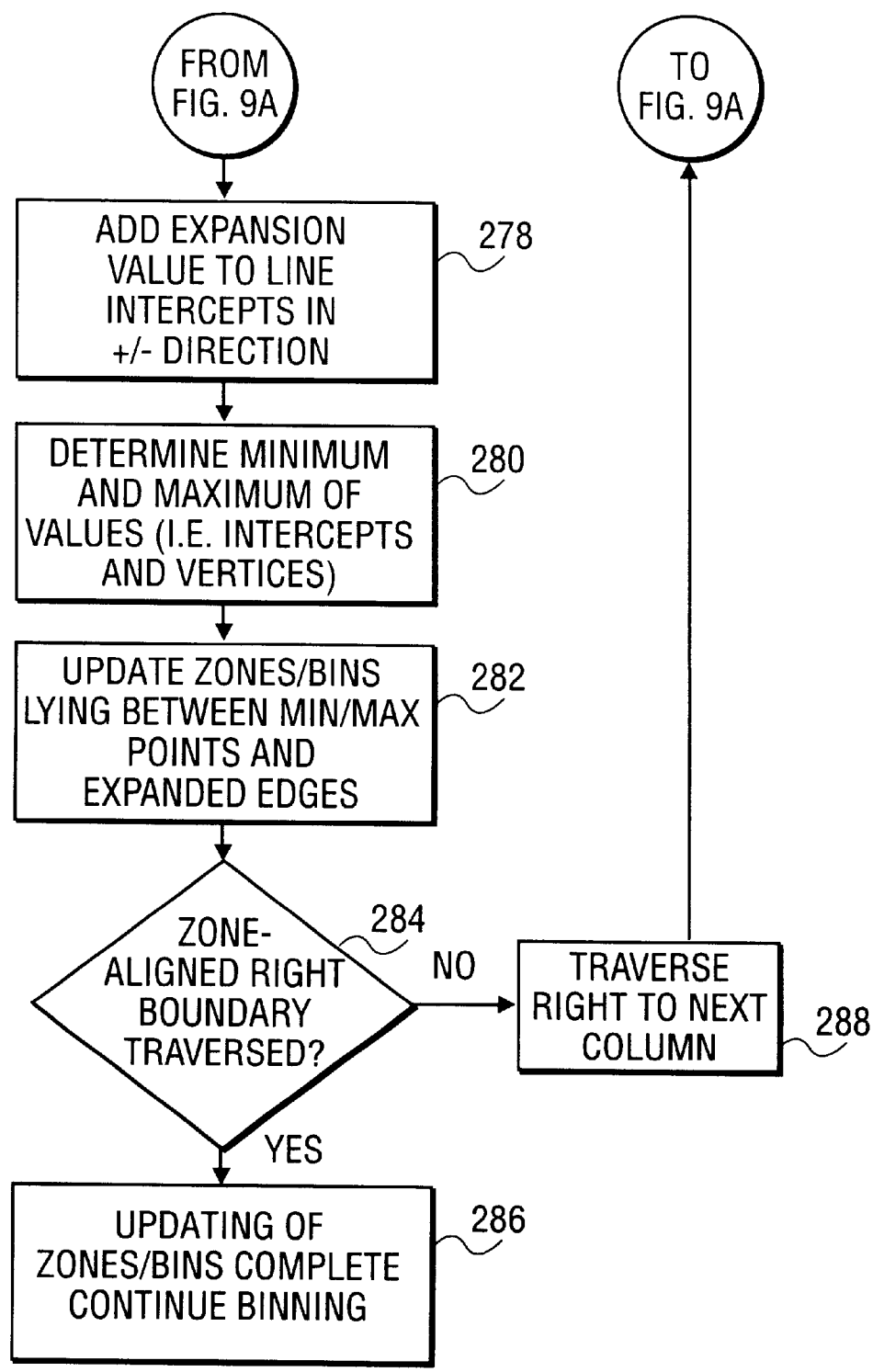

FIG. 9 illustrates a detailed flow diagram of an embodiment 260 of a process for determining the bins that need to be updated for a line. When a line is identified for binning (step 262), line parameters such as vertices v0 and v1, line-width 226 and line-cap 228 are determined (step 264).

Bounding box region [x,y][min,max] 232 encloses line 224 and is formed by taking the minimum and maximum values of the line vertices' v0 and v1 x, y positions (step 266). Bounding box region 232 is traversed one column at a time, from boundary to boundary 238, 240.

Bounding box expansion value is then calculated in accordance with E=ceiling(lw/2+lc) (step 268). The bounding box edges are expanded by the expansion value (step 270). Starting at the left-most column of the bounding box region 232 (step 272), the left and right column edges are shifted by the expansion value (step 274).

Line intercepts, if any, are computed on these two modified edges 246 and 248 (step 276). The intercept value at 250 is further shifted outwardly along shifted intercept edge, such as 248, by expansion value (E) (step 278). Potentially six values (four potential expansion value modified line intercepts, and two potential vertices v0 and v1) reside within expanded bounding box column edges. The minimum and maximum values among the six potential values are determined (step 280). All of the zones residing between the minimum and maximum of the potentially six values within expanded bounding box column edges are updated (step 282). If another column in bounding box region 232 needs to be analyzed, the invention traverses right to the next column (step 288). Steps 274–282 are then repeated for each column traversed within bounding box region 232, until the opposite edge boundary is encountered. Once all of the columns in bounding box region 232 have been traversed (step 284), updating of the bins for line 224 is completed and the remainder of the binning process continued (step 286).

Triangle

Figure 10:
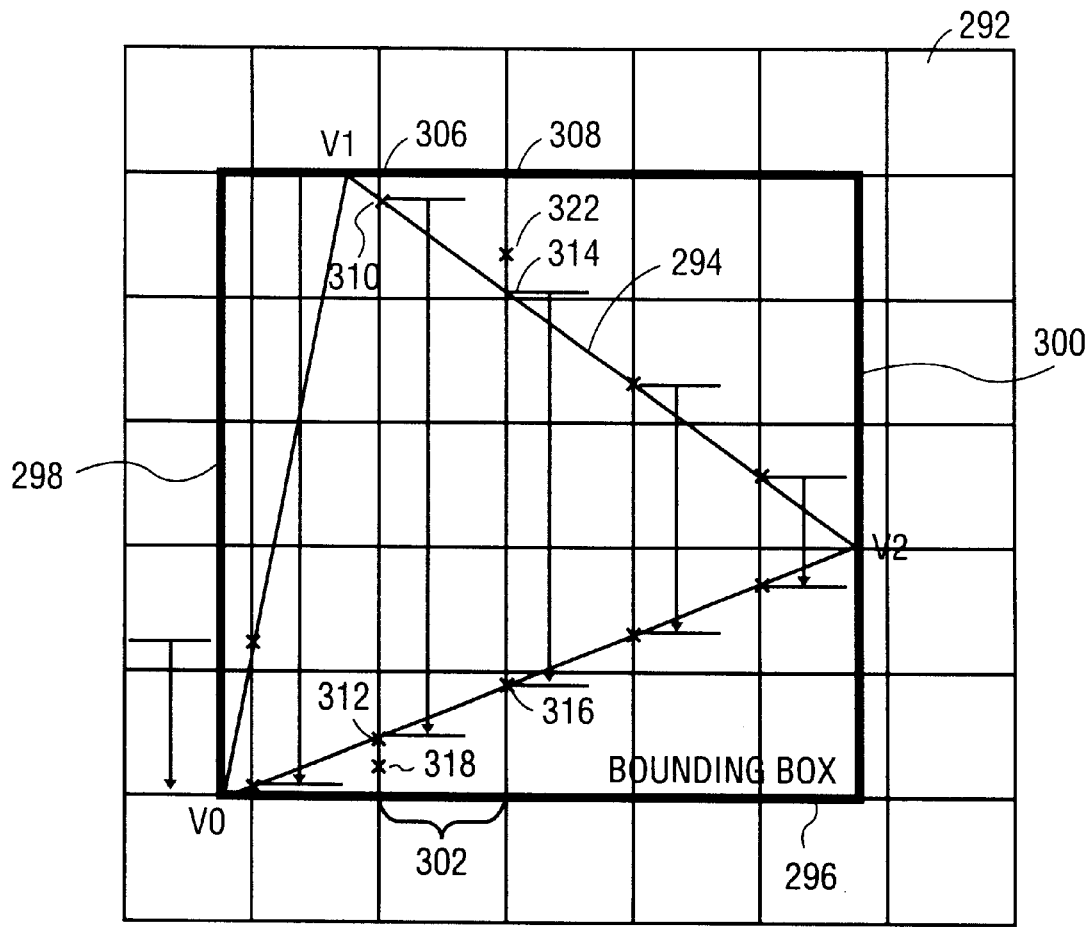
FIG. 10 illustrates a depiction of an embodiment of a screen view including zones and a triangle.

FIG. 10 illustrates a depiction of an embodiment 290 of a screen view including zones 292 and triangle 294. Triangle 294 is defined by vertices v0$x$, v0$y$, v1$x$, v1$y$, v2$x$ and v2$y$. Bounding box region [x,y][min, max] 296 encloses triangle 294 and is formed by taking the minimum and maximum value of the triangle vertices v0, v1 and v2 x and y positions and can be defined as follows:

$$bb\_xmin = min(v0x, v1x, v2x) \quad \text{(Eq. 15)}$$

$$bb\_ymin = min(v0y, v1y, v2y) \quad \text{(Eq. 16)}$$

$$bb\_xmax = max(v0x, v1x, v2x) \quad \text{(Eq. 17)}$$

$$bb\_ymax = max(v0y, v1y, v2y) \quad \text{(Eq. 18)}$$

Bounding box region 296 is traversed one column of zones at a time, from left boundary 298 to right boundary 300. One skilled in the art will recognize that the direction bounding box region 296 is traversed is not critical to the invention. For example, bounding box region 296 could be traversed from right to left and so forth. Each individual bounding box column traversed, such as bounding box column 302, has an initial width of one zone and a top and bottom boundary defined by bounding box region 296.

To determine the zones within a column 302, line intercepts, if any, are computed on the column right and left edges. Any line intercepts are computed on these two edges 306 and 308. For example, triangle 294 intercepts left column edge 306 at locations 310 and 312 and triangle 294 intercepts right edge 308 at locations 314 and 316.

The intercept values at 310, 312, 314 and 316 are further shifted outwardly along intercept edges by predefined value (E). For example, intercept at location 312 is further shifted downward by predefined value E to computed point 318. Computed point 318 resides below point 312 to minimize any bits being missed.

Similarly, intercept at location 314 is further shifted by predefined value E to computed point 322. The intercept value at 314 is shifted upwards by value E such that computed point 322 resides above point 314 for the upper end of the line to minimize any bits being missed.

The intercept values are thus adjusted by a predefined amount, such as a pixel or rounded upwards or downwards, to account for the error introduced by the inverse computation and the finite precision of the multiply and add operations.

Potentially eleven values (eight potential shifted line intercepts, and three potential vertices v0, v1 and v2) reside within bounding box column edges. All of the zones residing between the minimum and maximum of the potentially eleven values residing within expanded bounding box column edges are updated. For example, the minimum and maximum points define the top and bottom of column 302 and the column edges, such as edges 306 and 308, define the right and left sides.

As the bounding box region 296 is traversed, the intercepts computed on a column edge can be used for the present and next column.

Figure 11A:
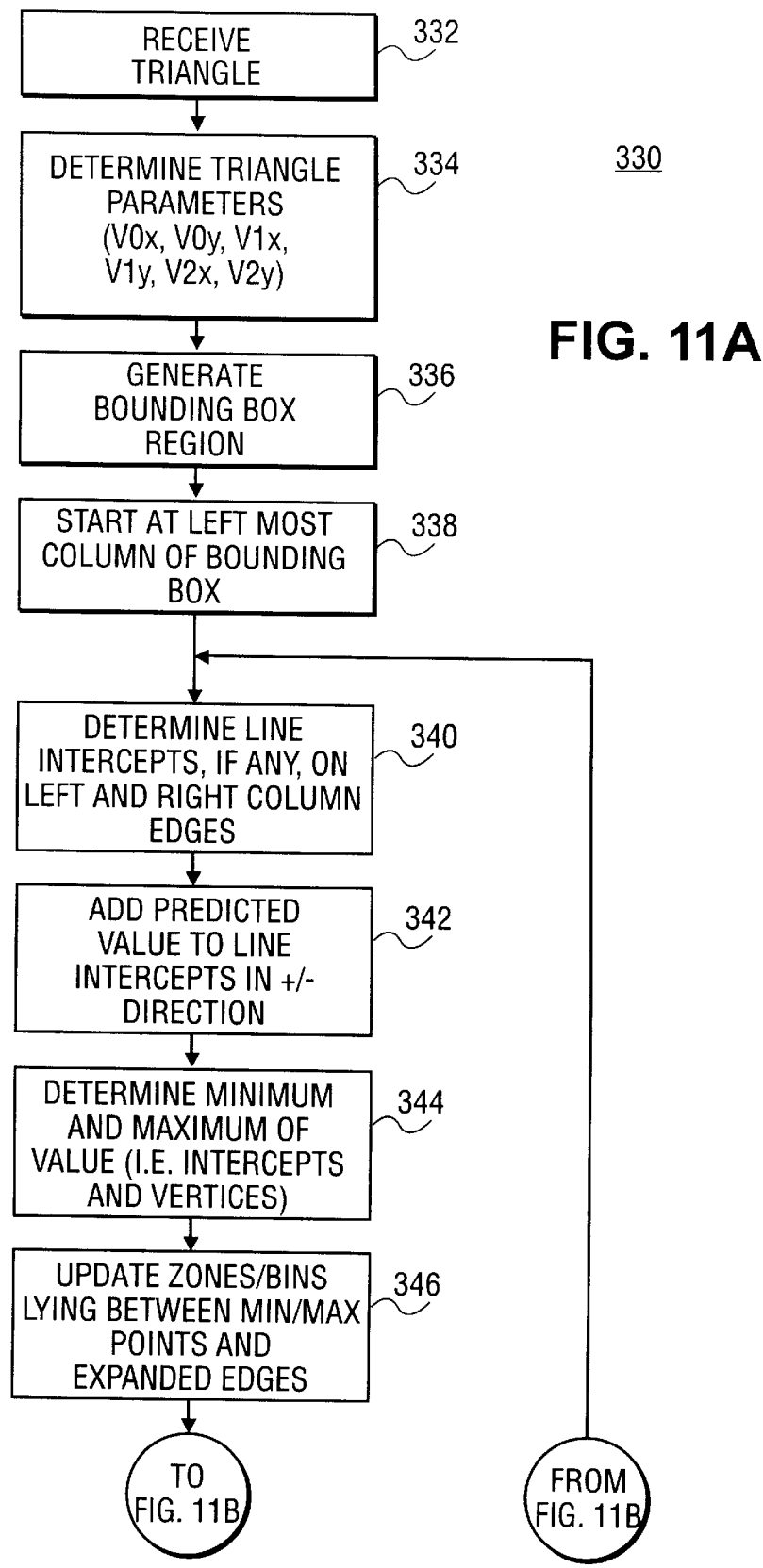
FIG. 11 illustrates a detailed flow diagram of an embodiment of a process for determining the bins that need to be updated for a triangle.
Figure 11B:
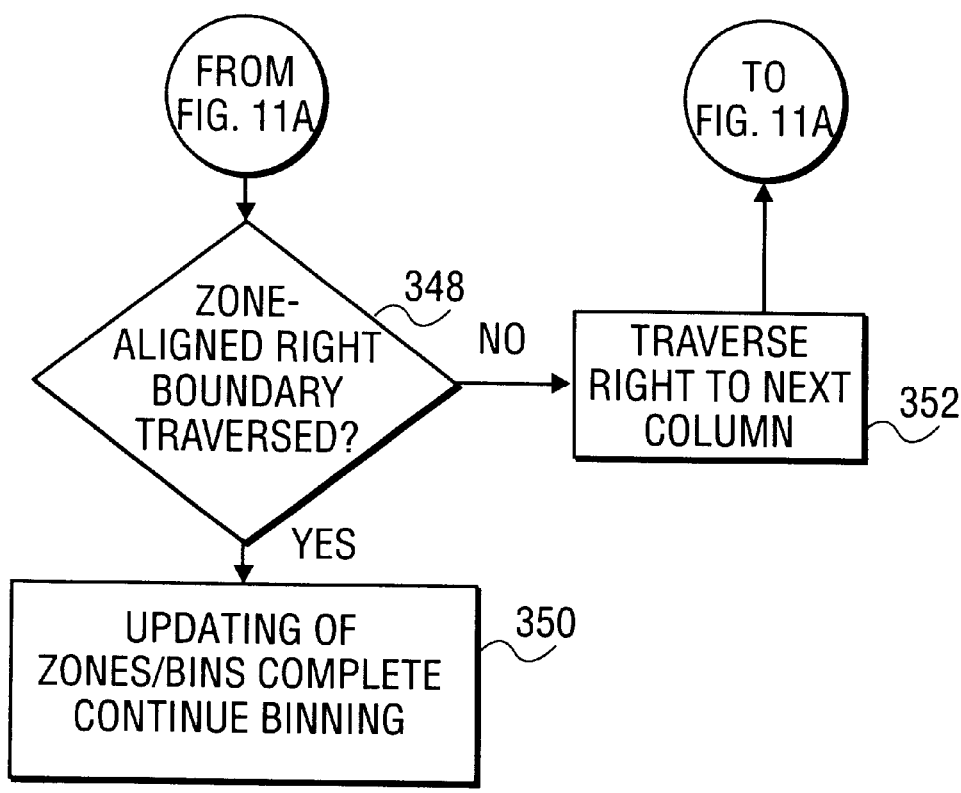

FIG. 11 illustrates a detailed flow diagram of an embodiment 330 of a process for determining the bins that need to be updated for a triangle.

After a triangle is identified for binning (step 332), triangle parameters such as vertices v0, v1 and v2 are determined (step 334).

Bounding box region [x,y][min,max] 296 encloses triangle 294 and is formed by taking the minimum and maximum values of the line vertices' v0, v1 and v2 x, y positions (step 336). The process starts at the left-most column of the bounding box region 296 (step 338).

Line intercepts, if any, are computed on column edges 298 and 300 (step 340). The intercept value at 250 is further shifted outwardly along column edge, such as edge 248, by expansion value (E) (step 342). Potentially eleven values (eight potential shifted line intercepts, and three potential vertices v0, v1 and v2) reside within expanded bounding box column edges. The minimum and maximum of the eleven potential values are determined (step 344). All of the zones lying between the minimum and maximum of the values within expanded bounding box column edges are updated (step 346). If another column in bounding box region 232 needs to be analyzed, the invention traverses to the next column (step 348). Steps 340–346 are then repeated for each column traversed within bounding box region 296, until the opposite edge boundary is met. If all the columns have been traversed in bounding box region 296 (step 348), updating of the zones for triangle 294 is completed and the remainder of the binning process continued (step 350). After all of the objects in the scene have been sorted into bins, the rendering-engine renders the bins associated with the zones determined to be intersected in accordance with the present invention to generate a final image.

Bounding box region 296 is traversed one column at a time, from boundary to boundary 298, 300. If another column in bounding box region 296 needs to be analyzed, the invention traverses right to the next column (step 352).

Thus, embodiments of the present invention allow determination of an almost precise number of zones that a polygon overlaps based on its type and vertex coordinates. Consequently, there are fewer write backs to batch buffers during the binning phase and fewer polygons to be set up during the render phase.

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A method to render a view comprising at least one geometric polygon within a zone renderer including a plurality of zones, comprising:

determining a bounding box for at least one graphics polygon in said view, each bounding box defining an area that encloses said geometric polygon;

determining characteristics of the polygon including vertex coordinate values;

selecting zones to process the at least one graphics polygon based upon the minimum and maximum of line intercept and vertex coordinate values; and processing bins associated with each selected zone such that those pixels covered by the at least one geometric polygon and contained in the selected zone are processed.

2. The method of claim 1, wherein selecting zones to process the at least one graphics polygon based upon the minimum and maximum of line intercept and vertex coordinate values, further comprises:

traversing the bounding box column by column and determining line intercept values for each edge of the column;

determining line intercept values;

shifting the line intercept values to expand the intercept values;

determining the minimum and maximum of the line intercept, shifted line intercept and vertex coordinate values; and using the minimum and maximum values to determine to bins associated with zones to be processed.

3. The method of claim 2, wherein shifting the line intercept values to expand the intercept values further comprises:

shifting the intercept values by a predefined amount.

4. The method of claim 2, wherein selecting zones for processing the at least one graphics polygon based upon the minimum and maximum of line intercept and vertex coordinate values further comprises:

expanding the bounding box column on both edges;

determining line intercept values at expanded edges;

shifting the line intercept values to expand the line intercept values at expanded edges;

determining the minimum and maximum of the line intercept, shifted line intercept and vertex coordinate values; and using the minimum and maximum values to determine to bins associated with zones to be processed.

5. The method of claim 4, wherein determining characteristics of the polygon including vertex coordinate values further comprises:

determining the line width and line cap of the line.

6. The method of claim 4, wherein the line width and line cap are programmable constants.

7. The method of claim 4, wherein edges parallel to the line are located at a distance line width divided by two from the line and line cap edges are perpendicular to the line.

8. The method of claim 7, wherein expanding the bounding box column on both edges further comprises:

calculating the expanded value in accordance with E=ceiling(line width/2+lc).

9. The method of claim 1, wherein the polygon comprises a line.

10. The method of claim 9, wherein determining the minimum and maximum of the line intercept, shifted line intercept and vertex coordinate values further comprises:

determining the minimum and maximum among potentially six line intercept, shifted line intercept and vertex coordinate values.

11. A machine readable medium having stored therein a plurality of machine readable instructions executable by a processor to render a view including at least one geometric polygon within a zone renderer including a plurality of zones, the machine readable instructions comprising:

instructions to determine a bounding box for at least one graphics polygon in said view, each bounding box defining an area that encloses said geometric polygon;

instructions to determine characteristics of the polygon including vertex coordinate values;

instructions to select zones to process the at least one graphics polygon based upon the minimum and maximum of line intercept and vertex coordinate values; and instructions to process bins associated with each selected zone such that those pixels covered by the at least one geometric polygon and contained in the selected zone are processed.

12. The machine readable medium of claim 11, wherein instructions to select zones to process the at least one graphics polygon based upon the minimum and maximum of line intercept and vertex coordinate values, further comprises:

instructions to traverse the bounding box column-by-column and determining line intercept values for each edge of the column;

instructions to determine line intercept values;

instructions to shift the line intercept values to expand the intercept values;

instructions to determine the minimum and maximum of the line intercept, shifted line intercept and vertex coordinate values; and instructions to use the minimum and maximum values to determine to bins associated with zones to be processed.

13. The machine readable medium of claim 12, wherein instructions to shift the line intercept values to expand the intercept values further comprises:

instructions to shift the intercept values by a predefined amount.

14. The machine readable medium of claim 12, wherein instructions to select zones for processing the at least one graphics polygon based upon the minimum and maximum of line intercept and vertex coordinate values further comprises:

instructions to expand the bounding box column on both edges;

instructions to determine line intercept values at expanded edges;

instructions to shift the line intercept values to expand the line intercept values at expanded edges;

instructions to determine the minimum and maximum of the line intercept, shifted line intercept and vertex coordinate values; and instructions to use the minimum and maximum values to determine to bins associated with zones to be processed.

15. The machine readable medium of claim 14, wherein instructions to determine characteristics of the polygon including vertex coordinate values further comprises:

instructions to determine the line width and line cap of the line.

16. The machine readable medium of claim 14, wherein the line width and line cap are programmable constants.

17. The machine readable medium of claim 14, wherein edges parallel to the line are located at a distance line width divided by two from the line and line cap edges are perpendicular to the line.

18. The machine readable medium of claim 14, wherein instructions to expand the bounding box column on both edges further comprises:

instructions to calculate the expanded value in accordance with E=ceiling(line width/2+lc).

19. The machine readable medium of claim 11, wherein the polygon comprises a line.

20. The machine readable medium of claim 19, wherein instructions to determine the minimum and maximum of the line intercept, shifted line intercept and vertex coordinate values further comprises:

instructions to determine the minimum and maximum among potentially six line intercept, shifted line intercept and vertex coordinate values.

21. A method to determine zones that a line intersects, comprising:

determining a bounding box for the line;

determining characteristics of the line including vertex coordinate values;

selecting zones to process line based upon the minimum and maximum of line intercept and vertex coordinate values; and processing bins associated with each selected zone such that those pixels covered by the line and contained in the selected zone are processed.

22. The method of claim 21, wherein selecting zones to process the line based upon the minimum and maximum of line intercept and vertex coordinate values, further comprises:

traversing the bounding box column by column and determining line intercept values for each edge of the column;

determining line intercept values;

shifting the line intercept values to expand the intercept values;

determining the minimum and maximum of the line intercept, shifted line intercept and vertex coordinate values; and using the minimum and maximum values to determine to bins associated with zones to be processed.

23. The method of claim 22, wherein determining the minimum and maximum of the line intercept, shifted line intercept and vertex coordinate values further comprises:

determining the minimum and maximum among potentially six line intercept, shifted line intercept and vertex coordinate values.

24. The method of claim 21, wherein selecting zones to process the line based upon the minimum and maximum of line intercept and vertex coordinate values further comprises:

expanding the bounding box column on both edges;

determining line intercept values at expanded edges;

shifting the line intercept values to expand the line intercept values at expanded edges;

determining the minimum and maximum of the line intercept, shifted line intercept and vertex coordinate values; and using the minimum and maximum values to determine to bins associated with zones to be processed.

25. The method of claim 21, wherein determining characteristics of the line including vertex coordinate values further comprises:

determining the line width and line cap of the line.

26. The method of claim 24, wherein expanding the bounding box column on both edges further comprises:

calculating the expanded value in accordance with E=ceiling(line width/2+lc).

* * * * *